(12) United States Patent
Tanaka et al.

(10) Patent No.: US 9,406,270 B2
(45) Date of Patent: Aug. 2, 2016

(54) LIQUID CRYSTAL DISPLAY DEVICE AND METHOD OF DRIVING THE SAME

(71) Applicant: Japan Display Inc., Minato-ku (JP)

(72) Inventors: Yukio Tanaka, Tokyo (JP); Daiichi Suzuki, Tokyo (JP); Kenji Nakao, Tokyo (JP)

(73) Assignee: Japan Display Inc., Minato-ku (JP)

( * ) Notice: Subject to any disclaimer, the term of this patent is extended or adjusted under 35 U.S.C. 154(b) by 20 days.

(21) Appl. No.: 14/294,471

(22) Filed: Jun. 3, 2014

(65) Prior Publication Data

US 2014/0375535 A1 Dec. 25, 2014

(30) Foreign Application Priority Data

Jun. 19, 2013 (JP) ................................. 2013-128458

(51) Int. Cl.
*G09G 3/36* (2006.01)

(52) U.S. Cl.
CPC ............ *G09G 3/3648* (2013.01); *G09G 3/3614* (2013.01); *G09G 2340/0435* (2013.01)

(58) Field of Classification Search
CPC .............. G09G 3/3648; G09G 3/3614; G09G 2340/0435; G09G 3/36
See application file for complete search history.

(56) References Cited

U.S. PATENT DOCUMENTS

| 2011/0109862 | A1* | 5/2011 | Harada | ............. | G02F 1/134363 |
| | | | | | 349/141 |
| 2013/0088479 | A1* | 4/2013 | Kim | ..................... | G09G 3/3614 |
| | | | | | 345/212 |
| 2013/0106824 | A1* | 5/2013 | Yamauchi | ............ | G09G 3/3258 |
| | | | | | 345/211 |
| 2015/0145842 | A1* | 5/2015 | Maeda | ................. | G09G 3/3233 |
| | | | | | 345/208 |

FOREIGN PATENT DOCUMENTS

| JP | 2009-175212 | | 8/2009 |
| JP | 2012-18271 | | 1/2012 |
| JP | 2012018271 | A * | 1/2012 |
| JP | 2013-54385 | | 3/2013 |
| JP | 2013-101182 | | 5/2013 |
| WO | 2012/165302 | A1 | 12/2012 |
| WO | 2013/024754 | A1 | 2/2013 |

OTHER PUBLICATIONS

Office Action mailed May 10, 2016 in Japanese Patent Application No. 2013-128458 (with English Translation).

* cited by examiner

*Primary Examiner* — Kent Chang
*Assistant Examiner* — Mark Edwards
(74) *Attorney, Agent, or Firm* — Oblon, McClelland, Maier & Neustadt, L.L.P.

(57) ABSTRACT

According to one embodiment, a liquid crystal display device includes a first substrate, a second substrate, a liquid crystal layer, a driver and a control circuit. The control circuit is configured to cause the driver to carry out one of an ordinary driving and an intermittent driving, which is set by switching. The control circuit supplies signals to a plurality of pixel electrodes of each of columns of the pixel electrodes in each of frame periods in the intermittent driving, the supplied signals having polarities inverted in units of at least one row.

11 Claims, 5 Drawing Sheets

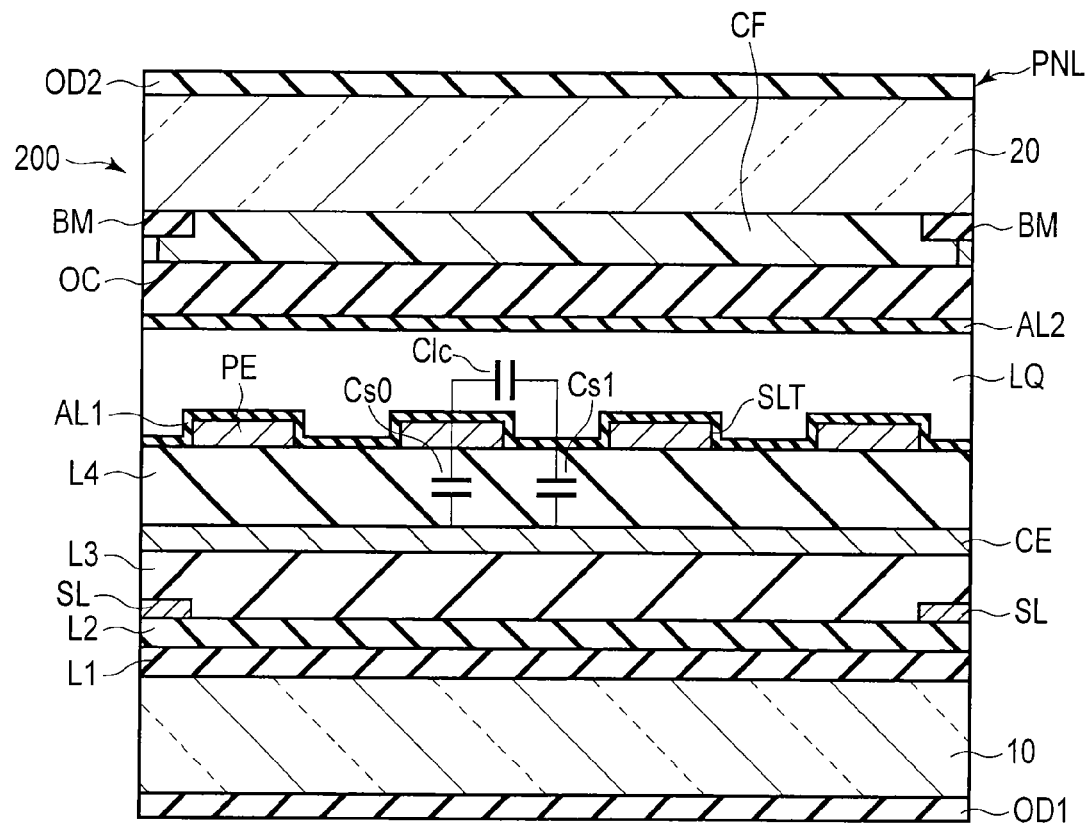
F I G. 2

LIQUID CRYSTAL DISPLAY DEVICE AND METHOD OF DRIVING THE SAME

CROSS-REFERENCE TO RELATED APPLICATIONS

This application is based upon and claims the benefit of priority from Japanese Patent Application No. 2013-128458, filed Jun. 19, 2013, the entire contents of which are incorporated herein by reference.

FIELD

Embodiments described herein relate generally to a liquid crystal display device and a method of driving the same.

BACKGROUND

Liquid crystal display devices are mounted at various devices, for example, a television receiver, a vehicle-mounted display such as a car navigation device, and mobile terminals such as a laptop computer, a tablet personal computer (PC), a cell phone, and a smart phone.

For example, in a twisted nematic (TN) mode liquid crystal display device and an optically compensated bend (OCB) mode liquid crystal display device, an alignment direction of liquid crystal molecules included in a liquid crystal layer held between an upper substrate and a lower substrate is controlled by a vertical electric field generated between the common electrode and the pixel electrodes.

In an in-plane switching (IPS) mode liquid crystal display device and a fringe-field switching (FFS) mode liquid crystal display device, a common electrode and pixel electrodes are provided in the same substrate, and an alignment direction of liquid crystal display molecules included in a liquid crystal layer is controlled by an electric field (fringe electric field) generated between the common electrode and the pixel electrodes. The FFS mode liquid crystal display device can ensure a great aperture ratio, and thus has a high brightness and a good viewing angle characteristic.

In particular, in liquid crystal display devices for use in mobile terminals such as a smart phone, it is indispensable that the power consumption of a circuit is reduced. Thus, as to matters related to the power consumption of a circuit, e.g., a polarity inversion type, it is necessary to select an optimal type. Generally, frame-inversion, line-inversion, column-inversion, dot-inversion, etc. are well known as polarity inversion types. In the line-inversion and the dot-inversion, writing is performed on pixels, while inverting the polarity in units of one line at the time of scanning a screen, as a result of which it is therefore necessary to perform charging and discharging of source lines at intervals of 1 horizontal (H) period, and the power consumption is increased.

Furthermore, in the frame inversion, the power consumption of a circuit is small; however, since the entire screen have the same polarity, if positive and negative luminance responses are made as different margins due to charging-up (image burn-in), etc., a flicker easily occurs.

In another aspect, a low-frequency drive scheme and an intermittent driving are proposed as means for reducing the power consumption of a circuit. The low-frequency drive scheme is a scheme to reduce power of a circuit by lowering a drive frequency of a liquid crystal display device to, e.g., ½ or ¼ of that under standard conditions. The intermittent driving is a scheme to reduce power of a circuit by stopping the circuit for a time period corresponding to several frames after wiring is performed for a single display time period (a single frame) of a liquid crystal display device. In both those drive schemes, since a frequency of rewriting a video signal in the liquid crystal display unit is small, for example, a blur can be generated in moving images. However, the drive schemes are effective measures to reduce power of a circuit in the case where they are applied to displaying of a still image or the like whose visibility is held in little account.

It should be noted that in both the above drive schemes, when the frequency of rewriting the video signal in the liquid crystal display unit is lowered, a polarity inversion frequency of a voltage to be applied to liquid crystal is inevitably lowered.

BRIEF DESCRIPTION OF THE DRAWINGS

FIG. 2 is a view schematically showing an example of cross sections of pixels in the liquid crystal display device as shown in FIG. 1;

DETAILED DESCRIPTION

In general, according to one embodiment, there is provided the liquid crystal display device comprising:

a first substrate comprising a plurality of pixel electrodes arranged in a matrix, a plurality of gate lines extending in a row direction of the arranged pixel electrodes, a plurality of source lines extending in a column direction of the arranged pixel electrodes, and a plurality of switching elements, and each of the switching elements being disposed close to an intersection of an associated one of the gate lines and an associated one of the source lines;

a second substrate located opposite to the first substrate;

a liquid crystal layer held between the first substrate and the second substrate;

a driver configured to the gate lines and the source lines; and a control circuit configured to cause the driver to carry out one of an ordinary driving and an intermittent driving in which an idle period for the driver is provided, said one of the ordinary driving and the intermittent driving being set by switching, the control circuit being also configured to supply signals to a plurality of pixel electrodes of each of columns of the pixel electrodes in each of frame periods in the intermittent driving, the supplied signals having polarities inverted in units of at least one row.

A liquid crystal display device according to an embodiment and a method of driving the liquid crystal display device will be described hereinafter with reference to the accompanying drawings.

Figure 1:
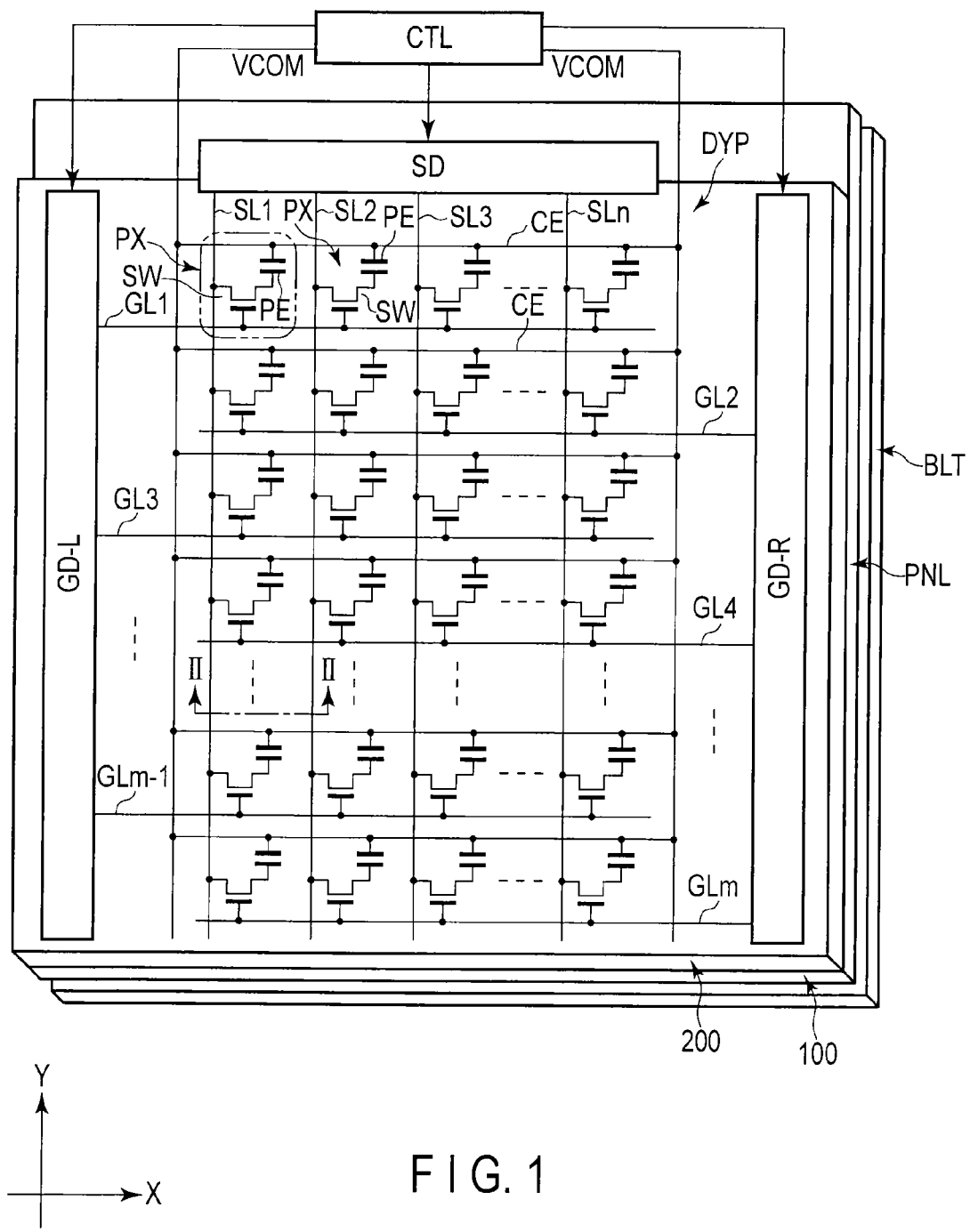
FIG. 1 is a view schematically showing an example of a structure of a liquid crystal display device according to an embodiment.

FIG. 1 is a view schematically showing an example of a structure of the liquid crystal display device according to the embodiment.

The liquid crystal display device according to the embodiment is, e.g., a fringe-field switching (FFS) liquid crystal display device, and comprises: a liquid crystal display panel PNL including a display unit including pixels PX arranged in a matrix; and a backlight unit BLT serving as illuminating means for illuminating the liquid crystal display panel PNL from a rear surface side thereof.

As the backlight unit BLT, various types of backlight units can be applied, and a backlight unit adopting a light-emitting diode (LED) or a cold-cathode fluorescent tube (CCFL) as a light source can also be applied. Detailed explanations of structures of those backlight units will be omitted.

The liquid crystal display panel PNL comprises an array substrate 100, a counter-substrate 200, a liquid crystal layer LQ held between the array substrate 100 and the counter-substrate 200, and an active area DYP including pixels PL arranged in a matrix. The active area DYP is a display area for displaying an image.

The array substrate 100 comprises, in the active area DYP, a plurality of source lines SL (SL1, SL2, . . . SLn), a plurality of gate lines GL (GL1, GL2, . . . GLm), a plurality of switching elements SW, a common electrode CE disposed over an area corresponding to a plurality of pixels PX, a plurality of pixel electrodes PE located opposite to the common electrode CE, and drivers configured to drive the gate lines GL and the source lines SL. The drivers include gate drivers GD-L and GD-R which drive the gate lines GL and a source diver SD which drives the source lines SL.

The source lines SL1, SL2, . . . SLn (where n is a positive integer) extend in a column direction (second direction Y) of arrangement of the pixels PX, and are also arranged in a row direction (first direction X) of the arrangement of the pixels PX. The source lines SL extend to a peripheral area (non-display area) of the active area DYP, and are electrically connected to the source driver SD.

The gate lines GL1, GL2, . . . GLm (where m is a positive integer) extend in the row direction (the first direction X) where the pixels PX are arranged, and are arranged in the column direction (the second direction Y). The gate lines GL extend to other peripheral areas of the active area DYP, and are electrically connected to the gate drivers GD-R and GD-L. To be more specific, the gate lines GL1, GL2, . . . GLm arranged in the column direction are alternately connected to the gate drivers GD-L and GD-R, the gate driver GDL being located on the left side of the active area DYP, the gate driver GD-R being located on the right side of the active area DYP. That is, of those gate lines GL, odd-numbered gate lines, which correspond to the gate lines GL1, GL3, . . . , are electrically connected to the gate driver GDL (first gate drive), and even-numbered gate liens, which correspond to the gate lines GL2, GL4, . . . , are electrically connected to the gate driver GD-R (second gate driver).

Each of the switching elements SW includes, e.g., a thin film transistor (TFT), and is located close to an intersection of an associated one of the source lines SL and an associated one of the gate lines GL. A gate electrode of each switching element SW is electrically connected to the associated gate line GL (or it is formed integral with the associated gate line GL). A source electrode of each switching element SW is electrically connected to the associated source line SL (or it is formed integral with the associated source line SL). Furthermore, a drain electrode of each switching element SW is electrically connected to an associated one of the pixel electrodes PE (or it is formed integral with the associated pixel electrode PE).

The gate driver GD-L, the gate driver GD-R and the source driver SD are located in the peripheral areas of the active area DYP. From the gate driver GD-L and the gate driver GD-R, on-voltages are successively applied to the plurality of gate lines GL. To be more specific, when an on-voltage is applied to a gate line GL, it is also applied to a gate electrode of a switching element SW electrically connected to the gate line GL. As a result, electric conduction is effected between source and drain electrodes of the switching element SW. Furthermore, the source driver SD supplies output signals to the source lines SL, respectively. To be more specific, when an output signal is supplied to a source line SL, it is also supplied to an associated pixel electrode PE through the switching element SW where electrical conduction is effected the source and drain electrodes.

A control circuit CTL is provided outside the liquid crystal display panel PNL, and controls operations of the gate driver GD and the source driver SD.

The pixel electrodes PE are provided in the pixels PX, respectively. In the pixel electrodes PE, slits SLT (as shown in FIG. 2) are formed as described later. To each of the pixel electrodes PE, video signal is supplied through the source line SL and the switching element SW.

The common electrode CE is located opposite to the pixel electrodes PE. Between the common electrode CE and the pixel electrodes PE, insulating layer is provided. To the common electrode CE, a common voltage VCOM is applied by the control circuit CTL located outside the liquid crystal display panel PNL.

The pixel electrodes PE and the common electrode CE are transparent electrodes formed of, e.g., indium tin oxide (ITO) or indium zinc oxide (IZO).

FIG. 2 is a view schematically showing an example of cross sections of pixel electrodes in the liquid crystal display device as shown in FIG. 1. It shows only portions to be explained.

The array substrate 100 is formed using a first insulating substrate 10 having a light-transparent characteristic. To be more specific, a semiconductor layer not shown is provided on the first insulating substrate 10 and covered by a first interlayer insulating film L1. A conductive layer not shown such as a gate line is provided on the first interlayer insulating film L1, and covered by a second interlayer insulating film L2. The source lines SL are formed on the second interlayer insulating film L2, and covered by a passivation film L3 which is a third interlayer insulating film. The passivation film L3 reduces irregularity of a surface, which is caused by the switching elements SW and various lines provided under the passivation film L3.

The first interlayer insulating film L1, the second interlayer insulating film L2 and the passivation film L3 may be formed of inorganic films such as silicon nitride (SiN) or of organic films such as HRC.

The common electrode CE is provided on the passivation film L3, and covered by a fourth interlayer insulating film L4.

The pixel electrodes PE are provided on the fourth interlayer insulating film L4, and covered by a first alignment film AL1. Also, the pixel electrodes PE include slits SLTs. The slits SLTs extend in substantially parallel with, e.g., source lines SL. The slit SLT may be a hole formed in a shape of a slit.

The first alignment film AL1 is provided on a surface of the array substrate 100 facing the counter-substrate 200, and extends over a substantially entire of the active area DYP. The first alignment film AL1 covers the pixel electrodes PE, etc., and is also located on the fourth interlayer insulating film L4. The first alignment film AL1 is formed of material having a horizontal alignment characteristic.

The counter-substrate 200 is formed using a second insulating substrate 20 having a light-transparent characteristic. The counter-substrate 200 comprises a black matrix BM, color filters CF, an overcoat layer OC, a second alignment film AL2, etc.

The black matrix BM defines the pixels PX, and form apertures opposed to the pixel electrodes PE. That is, the black matrix BM is provided opposite to wiring portions such as the source lines SL, the gate lines and the switching elements. Although only part of the black matrix BM which extends in the extending direction of the source lines SL (i.e., the second direction Y) is shown, the black matrix BM may be formed such that another part extends in the extending direction of the gate lines GL (i.e., the first direction X). The black matrix BM is also disposed on an inner surface of the second insulating substrate 20 facing the array substrate 100.

The color filters CF are provided in association with the pixels PX. To be more specific, the color filters CF are provided at the apertures at the inner surface of the second insulating substrate 20, and also partially overlap with the black matrix BM. The color filters CF are arranged in the first direction X, and have different colors. For example, the color filters CF are formed of resin materials having three primary colors, i.e., red, blue, and green. Red color filters CFR formed of a resin material colored red are provided in association with red pixels; blue color filters CFB formed of a resin material colored blue are provided in association with blue pixels; and green color filters CFG formed of a resin material colored green are provided in association with green pixels. Boundaries between the above color filters CF overlap with the black matrix BM.

The overcoat layer OC covers the color filters CF, and reduces an influence of irregularity of surfaces of the color filters CF.

The second alignment film AL2 is located on a surface of the counter-substrate 200 facing the array substrate 100, and extends over a substantially entire of the active area DYP. Furthermore, the second alignment film AL2 covers the overcoat layer OC, etc. The second alignment film AL2 is formed of material having a horizontal alignment characteristic.

The first alignment film AL1 and the second alignment film AL2 are subjected to an alignment film treatment process (e.g., a rubbing or a light alignment process) for initial alignment of liquid crystal molecules of a liquid crystal layer LQ.

The array substrate 100 and the counter-substrate 200 are provided such that the first alignment film AL1 and the second alignment film AL2 are located opposite to each other. Furthermore, between the array substrate 100 and the counter-substrate 200, columnar spacers (not shown) formed of resin material and integral with one of the above substrates, and form a predetermined cell gap. With the cell cap provided, the array substrate 100 and the counter-substrate 200 are bonded to each other by a sealing member (not shown) provided outside the active area DYP.

The liquid crystal layer LQ is held in the cell gap provided between the array substrate 100 and the counter-substrate 200, and located between the first alignment film AL1 and the second alignment film AL2. The liquid crystal layer LQ is formed of a liquid crystal material having a positive or negative dielectric anisotropy.

A first optical element OD1 is bonded by an adhesive agent or the like to an outer surface of the array substrate 100, i.e., an outer surface 10B of the first insulating substrate 10 included in the array substrate 100. The first optical element OD1 is located between the liquid crystal display panel PNL and the backlight unit BLT, and controls a polarization state of incident light which is emitted from the backlight unit BLT and is incident on the liquid crystal display panel PNL. The first optical element OD1 includes a first polarizer having a first polarization axis (or a first absorption axis).

A second optical element OD2 is bonded by an adhesive agent or the like to an outer surface of the counter-substrate 200, i.e., an outer surface 20B of the second insulating substrate 20 included in the counter-substrate 200. The second optical element OD2 is located on a display surface side of the liquid crystal display panel PNL, and controls a polarization state of an emission light which is emitted from the liquid crystal display panel PNL. The second optical element OD2 includes a second polarizer having a second polarization axis (or a second absorption axis).

The first polarization axis of the first polarizer and the second polarization axis of the second polarizer are located, e.g., perpendicular to each other. The first polarizer and the second polarizer are provided in a cross Nicol alignment. To be more specific, one of the above polarizers is provided such that, e.g., its polarization axis is located parallel or perpendicular to an initial alignment direction of liquid crystal molecules, i.e., a first alignment treatment direction or a second alignment treatment direction. For example, if the initial alignment direction is parallel to the second direction Y, the polarization axis of one of the polarizers is parallel to the second direction Y or the first direction X.

The liquid crystal display device according to the embodiment can carry out an intermittent driving to reduce a drive power. The following explanation is given by referring to by way of example the case where a standard frame-inversion frequency of the liquid crystal display device is 60 Hz (i.e., the polarity of a voltage to be applied to liquid crystal is inverted at intervals of $1/60$ seconds).

In the case of displaying moving images, a drive frequency is 60 Hz. However, in the case where the liquid crystal display device displays a still image or the like whose visibility is held in little account, after writing of a single frame (scanning from the gate line GL1 to the gate lines GLm) is performed for a single frame period ($1/60$ seconds), an idle period corresponding to, e.g., one frame period, three frame periods, seven frame periods or fifty-nine frame periods, is provided. If the operation of the control circuit CTL is stopped for the idle period, the power consumption of the circuit for the idle period is substantially zero. As a result, the time-averaged power consumption of the circuit for the total operation including writing is reduced to $1/2$, $1/4$, $1/8$ or $1/60$ of that in the case where the idle period is not provided.

In the case where the liquid crystal display device carries out the above intermittent driving, after a signal (voltage) is supplied to each of the pixels, it needs to be held for a long time period. It is therefore preferable that switching elements SW whose off-leakage current is small be used as the switching elements SW. For example, a switching element SW including a TFT using IGZO (an oxide comprising indium (In), gallium (Ga) and zinc (Zn)) is suitable for the above intermittent driving, i.e., a low-frequency drive scheme, since the off-leakage current of the TFT is smaller than those of other TFTs.

The liquid crystal display device according to the embodiment is an FFS mode liquid crystal display device which causes a liquid crystal layer LQ to generate an electric field due to a potential difference between voltages to be applied to the common electrode CE and the pixel electrodes PE, to control the alignment direction of liquid crystal molecules included in the liquid crystal layer LQ. By controlling the alignment direction of the liquid crystal molecules, the transmitted-light volume of light emitted from the backlight unit BLT is controlled. It should be noted that the operation of the backlight unit BLT is controlled by the control circuit CTL.

Needless to say, a capacitance component CsO generate between each of the pixel electrodes PE and the common electrode CE, which are located opposite to each other, with the fourth interlayer insulating film L4 interposed between them. In addition, a liquid crystal capacitance Clc and an auxiliary capacitance component Cs1 corresponding to an electric field generated in the liquid crystal layer LQ are present. Where a total capacitance, which corresponds to all the capacitances between the pixel electrodes PE and the common electrode CE, is denoted by Cs, it is considered that the capacitance Cs is provided between the drain of the switching element SW and the common electrode CE.

Next, an example of a method of driving the above liquid crystal display device will be described with reference to the accompanying drawings.

Figure 5:
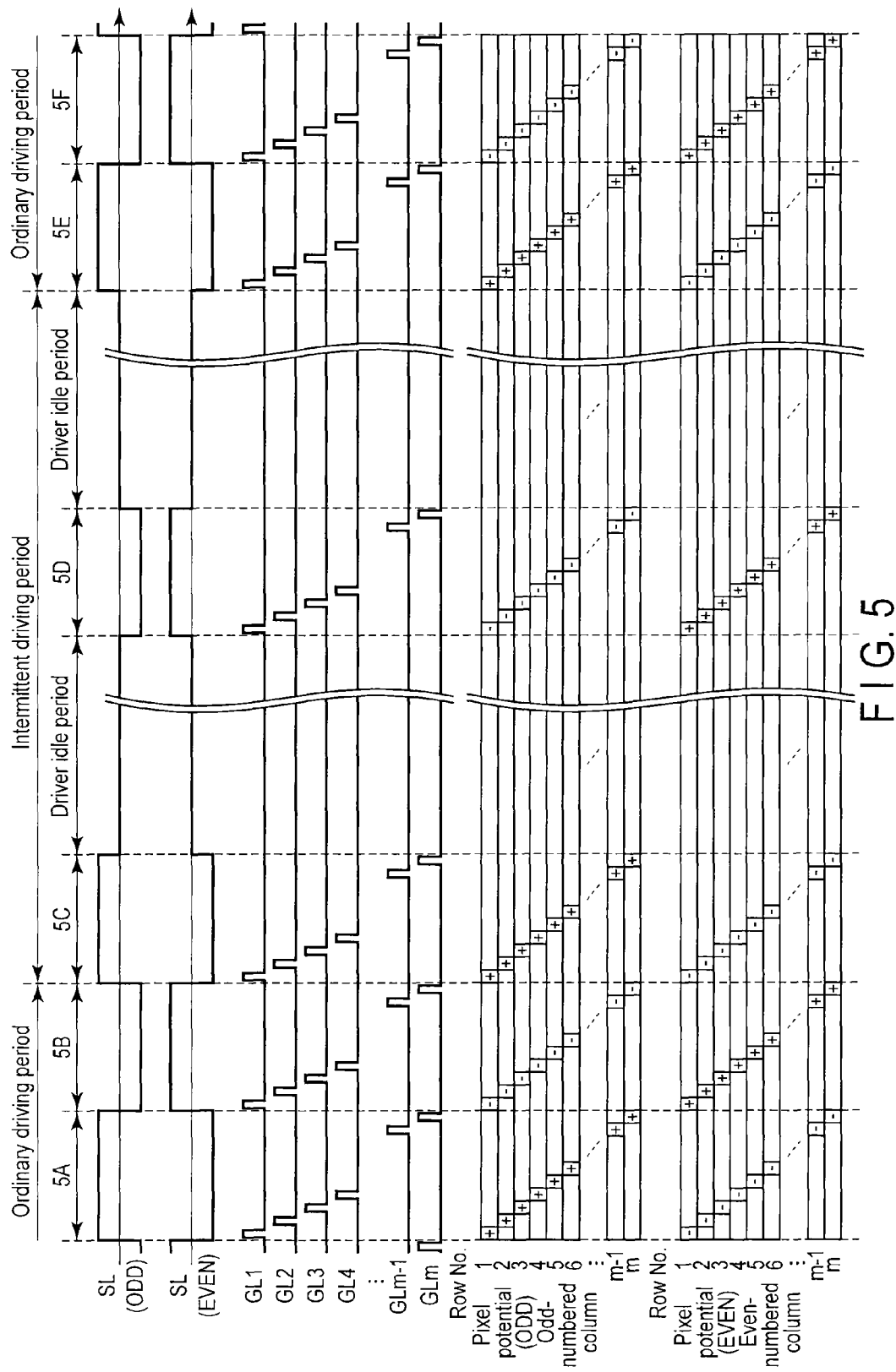
FIG. 5 is a view for use in explaining an example of a method of driving a liquid crystal display device of a comparative example.

FIG. 5 is a view for use in explaining an example of a method of driving a liquid crystal display device of a comparative example. In this example, the control circuit CTL can effect switching between an ordinary driving and the intermittent driving. In this example, a frame-inversion frequency in the ordinary driving is, e.g., 60 Hz (that is, the polarity of a voltage to be applied to liquid crystal is inverted at intervals of 1/60 seconds), and in the intermittent driving, after writing of a single frame is performed for a single frame period (1/60 seconds), the drivers are stopped for a time period (driver idle period) corresponding to, e.g., one frame period, three frame periods, seven frame periods or fifty-nine frame periods. For example, the control circuit CTL causes the ordinary driving to be carried out in the case of displaying moving images, and also the intermittent driving to be carried out in the case of displaying a still image.

In the ordinary driving and the intermittent driving, the control circuit CTL controls operations of the gate driver GD-L, the gate driver GD-R and the source driver SD such that signals supplied to pixel electrodes PE arranged in the column direction (the second direction Y) have the same polarity in each frame, and their polarity is inverted each time the frame changes.

FIG. 5 shows potentials of odd-numbered source lines (SL (ODD)) and even-numbered source lines (SL (EVEN)) and the gate lines GL1, GL2, . . . GLm (where m is the number of gate lines in the active area), and also polarities of voltages, which are held by the pixel electrodes by carrying out the ordinary driving and the intermittent driving.

In order that the following structure be simply explained, it will be by referring to by way of example the case where a gray image is displayed as video in the entire area such that the entire displayed gray image has the same level gray scale; and in the following explanation, blanking periods between frames in the ordinary driving are ignored.

In this example, a column-inversion drive scheme is adopted as a polarity inversion drive scheme, and thus the polarity of the potential of each of the odd-numbered source lines is reverse to that of each of the even-numbered source lines. Therefore, the waveform of each odd-numbered source line is reverse to that of each even-numbered source line.

Furthermore, in the ordinary driving and the intermittent driving, in the case where signals are supplied to pixel electrodes PE arranged in the column direction (the second direction Y), signals having the same polarity are supplied to each of columns of pixel electrodes PE. Thus, signals having the same potential are supplied for a scanning period in which the gate lines GL1-GLm are successively scanned.

For example, in a frame period 5A which is an initial frame period of an ordinary driving period, the potentials of the source lines SL (ODD) are continuously kept at a positive constant value, and the potentials of the source lines SL (EVEN) are continuously kept at a negative constant value; and in a frame period 5B subsequent to the frame period 5A, the potentials of the source lines SL (ODD) are continuously kept at a negative constant value, and the potentials of the source lines SL (EVEN) are continuously kept at a positive constant value.

As each of the gate lines GL1-GLm is scanned, voltage signals corresponding to the potential of the source lines SL (ODD) or the source lines SL (EVEN) are written to the pixel electrodes PE of an associated row; and the above voltage signals are held until subsequent writing is performed.

In the intermittent driving, in frame periods in which writing (scanning) is performed, for example, in frame periods 5C and 5D, driving is performed in the same pattern as in the frame periods 5A and 5B in the ordinary driving; however, driver idle periods are provided after completion of writing. In such a manner, by providing driver idle periods, the power consumption of a circuit can be reduced. It should be noted that for each of the driver idle periods, at the pixel electrodes PE, voltage signals (column-inversion state) supplied in the frame period 5C or 5D just precedent to each driver idle period are held.

In frame periods 5E and 5F in which the ordinary driving is carried out again, driving is performed in the same pattern in the frame periods 5A and 5B, which correspond to the first ordinary scheme drive period.

In this example, in the driver idle periods, the pixel electrodes PE are held in a polarity state of column inversion. For example, there is a case where if the potential of the common electrode differs from an optimal value, the luminance of pixels having positive polarity differs from that of pixels having negative polarity, and the luminance of even-numbered columns of pixels differs from that of odd-numbered columns of pixels, thus generating vertical streaks which are visually recognized. In the ordinary driving period, even if the luminance of pixels having positive polarity differs from that of pixels having negative polarity, since the polarities of the pixels are inverted at a high speed of approximately 60 Hz, the pixels are seen by a person as if their luminance were averaged, and in most cases, the person does not recognize a vertical streak. However, in each of the driver idle periods in the intermittent driving, the state of a displayed image is equivalent to that of a still image, and thus even if pixels have slight different luminance, there is a possibility that the person may recognize that a streak generates.

In general, in an inspection prior to shipment of each of completed products, the potential of a common electrode is optically adjusted to minimize the difference in luminance between pixels having positive polarity and pixels having negative polarity. However, for example, in an FFS mode liquid crystal, direct current (DC) charge-up occurs, which accompanies image burn-in, and as driving is continuously performed, the potential of a common electrode changes to differ from an optimal potential, as a result of which a vertical streak gradually appears.

Also, the DC charge-up becomes further remarkable as a frame-inversion frequency becomes lower. Thus, in a period in which the intermittent driving is carried out, a vertical streak easily appears.

Figure 3:
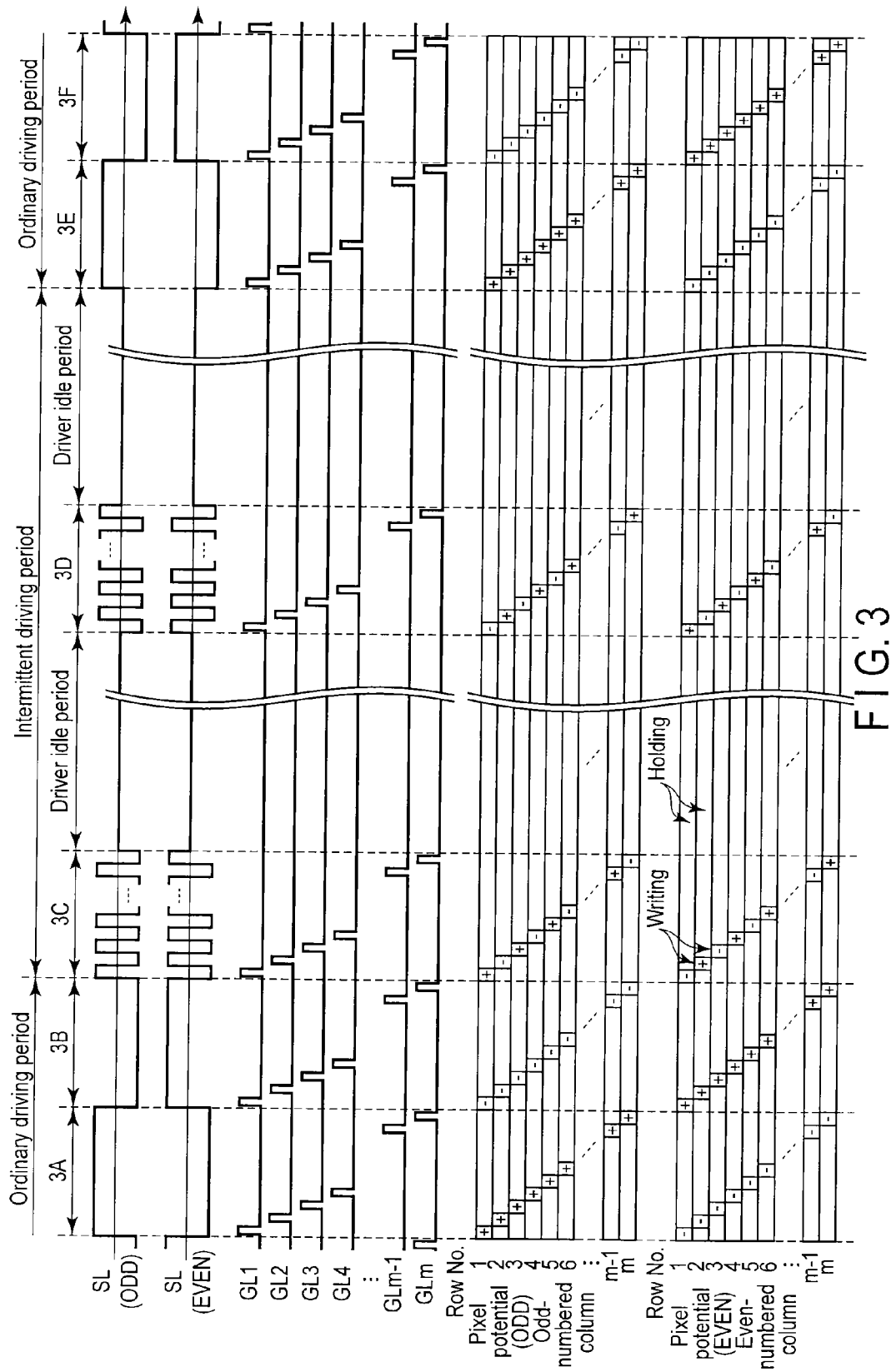
FIG. 3 is a view for use in explaining an example of a method of driving the liquid crystal display device according to the embodiment.

FIG. 3 is a view for use in explaining an example of a method of driving the liquid crystal display device according to the embodiment.

In this example, the control circuit CTL can effect switching between the ordinary driving and the intermittent driving as in the above example of FIG. 5. The control circuit CTL is configured to cause each of the drivers (GD-L, GD-R and SD) to carry out one of the ordinary driving and the intermittent driving, which is set by the switching. For example, a frame-inversion frequency in the ordinary driving is 60 Hz (that is, the polarity of a voltage to be applied to liquid crystal is inverted at intervals of 1/60 seconds), and in the intermittent driving, after writing of a single frame is performed in a single frame period (1/60 seconds), a driver idle period corresponding to, e.g., one frame period, three frame periods, seven frame periods or fifty-nine frame periods is provided.

In the case where the control circuit CTL supplies signals to pixel electrodes PE arranged in the column direction (the second direction Y), in the ordinary driving, the control circuit CTL supplies signals having the same polarity to the pixel electrodes PE in each of the frame periods, and in the intermittent driving, the control circuit CTL supplies signals having polarities inverted in units of at least one row to the pixel electrodes in each of the frame periods. In both the ordinary driving and the intermittent driving, the polarities of the signals supplied to pixel electrodes PE are inverted each time the frame is changed.

In the above example, in ordinary driving periods (frame periods 3A and 3B and frame periods 3E and 3F), an operation is performed in the same pattern as in the example shown in FIG. 5, and column-inversion is adopted as the polarity inversion scheme of the ordinary driving periods, and dot-inversion is adopted as the polarity inversion scheme of the intermittent driving period (the frame periods 3C and 3D and the driver idle periods).

The following explanation is given with respect to an intermittent driving period in which driving is performed in a different pattern from that in the example shown in FIG. 5 is carried out.

In frame periods (frame periods 3C and 3D) in which scanning is performed from the gate line GL1 to the gate line GLm, the potential of the source lines SL (ODD) and that of the source lines SL (EVEN) are inverted in polarity in units of one horizontal period. Also, the polarity of the potential of the source lines SL (ODD) is reverse to that of the source lines SL (EVEN).

Therefore, the pixel electrodes PE arranged in a matrix are inverted in polarity in a checkerwise manner; that is, dot-inversion is carried out. Thereafter, in the driver idle period also, the polarities of the pixel electrodes PE are held in a dot-inversion state. In the frame period 3D also, signals are supplied to the pixel electrodes PE as in the frame period 3C. Thus, in the frame periods 3C and 3D, the polarities of all the pixels PX are inverted.

When the intermittent drive period ends, and the drive scheme to be carried out is returned to the ordinary driving (frame periods 3E and 3F), the column-inversion drive scheme is re-carried out as in the frame periods 3A and 3B.

In such a manner, in the case where the dot-inversion drive scheme is carried out only for the intermittent driving period, even if the luminance of pixels PX having positive polarity differs from that of pixels PX having negative polarity due to variation of the potential of the common electrode and the DC charge-up, a vertical streak is not easily visibly recognized. This seems to be because that pixels having high and low luminance, i.e., light and dark pixels, are more dispersedly distributed in the active area DYP, and their specific periodicity cannot be easily visibly recognized, as a result of which a vertical streak is not viewable.

It should be noted that in the dot-inversion drive, it is necessary that the potential of the source lines SL (ODD) and that of the source lines SL (EVEN) are inverted in units of one horizontal period. Thus, if only the frame periods 3C and 3D are considered, the circuit power consumption increases due to charging and discharging of the source lines. This, however, can be minimized if the driver idle period is set to be sufficiently long. For example, in the intermittent driving, if the frequency of rewriting a video signal is 1 Hz, and each of the frame periods 3C and 3D is equal to each of the frame periods in the ordinary driving (e.g., a frame period corresponding to 60 Hz), the ratio of time when the gate drivers GD-L and GD-R and the source driver SD operate to that in the ordinary driving is substantially 1/60. It is therefore possible to ignore an increase in the power consumption.

Figure 4:
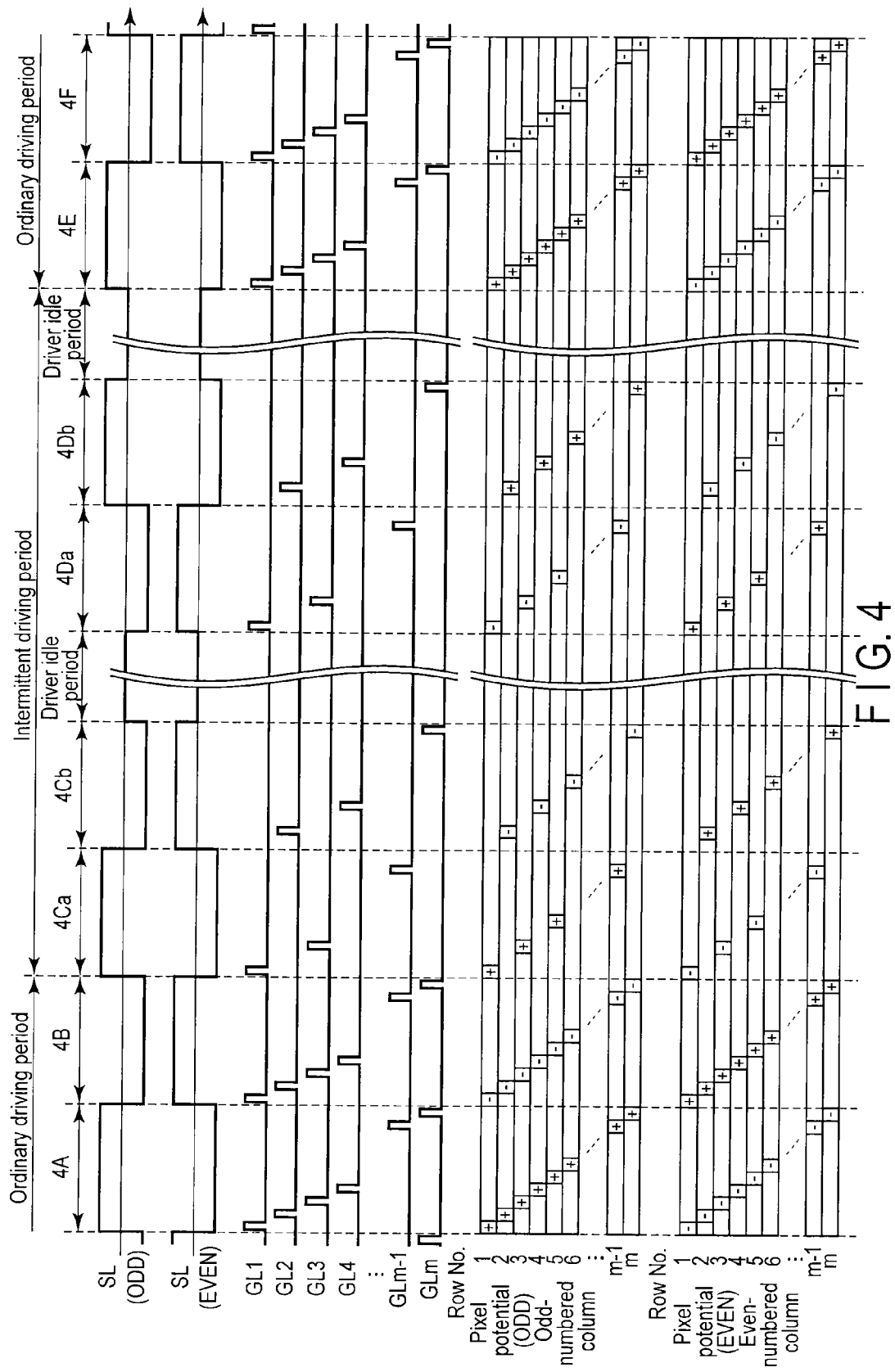
FIG. 4 is a view for use in explaining another method of the method of driving the liquid crystal display device according to the embodiment.

FIG. 4 is a view for use in explaining another example of the method of driving the liquid crystal display device according to the embodiment.

In this example, the control circuit CTL can effect switching between the ordinary driving and the intermittent driving as in the example of FIG. 5. For example, a frame-inversion frequency in the ordinary driving is 60 Hz (that is, the polarity of a voltage to be applied to liquid crystal is inverted at intervals of 1/60 seconds), and in the intermittent driving, after writing of a single frame is performed for two frame periods (1/30 seconds), a driver idle period corresponding to, e.g., two frame periods, six frame periods or fifty-eight frame periods, is provided.

In the example of FIG. 4, in scanning in the intermittent driving period, scanning of odd-numbered gate lines GL and that of even-numbered gate lines GL are separately performed. For example, scanning corresponding to that in the frame period 3C in the example of FIG. 3 is divided into scanning in a frame period 4Ca and that in a frame period 4Cb, and scanning corresponding to that in the frame period 3D in the example of FIG. 3 is divided into scanning in a frame period 4Da and that in a frame period 4Db.

In other words, the intermittent driving period in the example of FIG. 4 includes a first frame period (the frame periods 4Ca and 4Da) in which only the odd-numbered gate lines GL are driven and a second frame period (the frame periods 4Cb and 4Db) in which only the even-numbered gate lines GL are driven. To be more specific, in the intermittent driving period, in the frame periods 4Ca and 4Da, only the odd-numbered gate lines GL1, GL3, ... GLm−1 are successively selected, and in the frame periods 4Ca and 4Cb, only the even-numbered gate lines GL2, GL4, ... GLm (m is an even number) are successively selected. Here, each of the frame periods is equal to each of the frame periods in the ordinary driving (e.g., a frame period corresponding to 60 Hz). The first and second frame periods are set continuous with each other, and the first frame periods may be precedent to or subsequent to the second frame time periods, respectively.

With respect to the potentials of the source lines, for example, in the frame period 4Ca, the potential of each of the odd-numbered source lines SL (ODD) is set to a positively constant value in the frame period 4Ca, and in the frame period 4Cb, it is set to a negatively constant value; and in the frame period 4Ca, the potential of each of the even-numbered source lines SL (EVEN) is set to a negatively constant value, and in the frame period 4Cb, it is set to a positively constant value. That is, the polarity of the source lines in the frame period 4Da is reverse to that of the source lines in the frame period 4Ca. Also, the polarity of the source lines in the frame period 4Db is reverse to that in the source lines in the frame period 4Cb.

As a result, of pixels PX associated with the odd-numbered source lines SL (ODD), odd-numbered rows of pixels PX are subjected to writing with signals having positive polarity in the frame period 4Ca, and even-numbered rows of pixels PX are subjected to writing with signals having negative polarity in the frame period 4Cb. Also, of pixels PX associated with the even-numbered source lines SL, odd-numbered rows of pixels PX are subjected to writing with signals having negative polarity in the frame period 4Ca, and even-numbered rows of pixels PX (EVEN) are subjected to writing with signals having positive polarity in the frame period 4Cb. Further, in the driver idle periods, the polarities of the pixel electrodes PE are held in the dot-inversion state. Also, in the frame periods 4Da and 4Db and driver idle periods subsequent thereto, the polarities of the pixel electrodes PE are held in the dot-inversion state, while they are reverse to the polarities of the pixel electrodes PE in the frame periods 4Ca and 4Cb and driver idle period subsequent thereto.

In the example of FIG. 4, the polarities of the pixel electrodes PE are in the dot-inversion state in the intermittent driving period only, as in the example of FIG. 3. Even if the luminance of pixels PX having positive polarity differs from that of pixels PE having negative polarity due to variation of the potential of the common electrode and the DC charge-up, a vertical streak is not easily visibly recognized.

Furthermore, in the example of FIG. 3, the polarities of the source lines are inverted in units of one source line at the time of scanning for the intermittent driving, whereas such inversion does not need to be performed in the example of FIG. 4. To be more specific, in the example of FIG. 4, in each of the frame periods 4Ca and 4Cb or each of the frame periods 4Da and 4Db, the potentials of the source lines SL (ODD) can be set constant, and also those of the source lines SL (EVEN) can be constant. Thus, the circuit power consumption can be further reduced.

In addition, in the example of FIG. 3, there is a case where after polarity inversion, in video-signal writing to each of rows of pixel electrodes PE, correct video signals (voltages) cannot be supplied to the pixel electrodes PE due to lack of a signal-writing function of the source driver SD (lack of a slew rate); on the other hand, in the example of FIG. 4, it is not necessary to invert the polarities of the source lines in units of one horizontal period. It is therefore possible to restrict lack of writing, and further improve a visual quality.

It should be noted that in the example of FIG. 4, even in the intermittent driving period, the polarities of the pixel electrodes PE are momentarily held in the column-inversion state, as in transition from, e.g., the frame period 4Da to the frame period 4Db. This, however, has substantially no influence, since the time ratio of occurrence of such a state as stated above is substantially 1/60.

It should be noted that in order that the even-numbered gate lines GL and the odd-numbered gate lines GL be separately driven as in the embodiment, it is preferable that the even-numbered gate lines GL and the odd-numbered gate lines GL be driven by respective drivers as explained with reference to FIG. 1. In the embodiment, the odd-numbered gate lines GL are driven by the gate driver GD-L located on the left side, and the even-numbered gate lines are driven by the gate driver GD-R located on the right side. In such a manner, due to provision of a plurality of gate drivers, i.e., the gate drivers GD-L and GD-R, desired scanning (selection of only the odd-numbered gate lines GL or selection of only the even-numbered gate lines GL) can be performed by properly controlling a control signal from the control circuit CTL to the gate driver GD-L or the gate driver GD-R. The structure for driving the gate lines GL is not limited to the above structure. Various structures can be applied as long as each structure is made to enable the even-numbered gate lines GL and the odd-numbered gate lines GL to be driven at respective timings. For example, a single gate driver may be applied as a driver configured to drive the odd-numbered gate lines GL and the even-numbered gate lines GL at different timings.

It should be noted that in the examples of FIGS. 3 and 4, in the intermittent driving, the polarities of the pixels PX are in the dot-inversion state, and are inverted in units of one row. However, in the intermittent driving, the polarities of the pixels PX may be inverted in units of two rows (2H1V inversion) or in units of four rows (4H1V inversion) as occasion demands. However, in such a case, if there is a risk that a horizontal streak corresponding to an inversion cycle may be generated, it is preferable that the polarities of the pixels PX are inverted in units of one row (1H1V dot inversion).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above explanation is given with respect to the structure in which in the liquid crystal display device, the pixel electrodes PE and the common electrode CE are provided in the array substrate 100. However, the structure of the liquid crystal display device is not limited to a structure primarily utilizing a horizontal electric field (including a fringe electric field) as in, e.g., in-plane switching (IPS) mode or a fringe field switching mode (FFS). At least the pixel electrodes PE are included in the array substrate 100, and the common electrode CE may be included in either the array substrate 100 or the counter-substrate 200. In a structure primarily using a vertical electric field, such as structures using a twisted nematic (TN) mode, an optically compensated bend (OCB) mode and a vertical aligned (VA) mode, the common electrode CE is included in the counter-substrate 200. That is, it suffices that the common electrode CE is provided between the first insulating substrate 10 included in the array substrate 100 and the second insulating substrate 20 included in the counter-substrate 200.

What is claimed is:

1. A liquid crystal display device comprising:
    a first substrate comprising a plurality of pixel electrodes arranged in a matrix, a plurality of gate lines extending in a row direction of the arranged pixel electrodes, a plurality of source lines extending in a column direction of the arranged pixel electrodes, and a plurality of switching elements, and each of the switching elements being disposed close to an intersection of an associated one of the gate lines and an associated one of the source lines;
    a second substrate located opposite to the first substrate;
    a liquid crystal layer held between the first substrate and the second substrate;
    a driver configured to drive the gate lines and the source lines; and
    a control circuit configured to cause the driver to carry out one of a column-inversion driving and an intermittent dot-inversion driving in which an idle period for the driver is provided, said one of the ordinary driving and the intermittent driving being set by switching, the control circuit being also configured to supply signals to a plurality of pixel electrodes of each of columns of the pixel electrodes in each of frame periods in the intermittent driving, the supplied signals having polarities inverted in its of at least one row,
    wherein, during the idle time dot-inversion patterns that are supplied by the dot-inversion driving are held on the plurality of pixel electrodes.

2. The liquid crystal display device of claim 1, wherein in each of frame periods in the ordinary driving, the control circuit is configured to supply signals having the same polarity to said each column of pixel electrodes.

3. The liquid crystal display device of claim 1, wherein if the intermittent driving is set by the switching, in a first frame period, the control circuit causes the driver to drive only odd-numbered gate lines of the gate lines, and in a second frame period, the control circuit causes the driver to drive only even-numbered gate lines of the gate lines.

4. The liquid crystal display device of claim 3, wherein the driver comprises a first gate driver electrically connected to the odd-numbered gate lines and a second driver electrically connected to the even-numbered gate lines.

5. The liquid crystal display device of claim 4, wherein:
the first substrate further comprises a common electrode located below the pixel electrodes and opposite to the pixel electrodes, and an insulating layer located between the common electrode and the pixel electrodes; and
each of the pixel electrodes includes a hole formed in a shape of a slit.

6. The liquid crystal display device of claim 3, wherein:
the first substrate further comprises a common electrode located below the pixel electrodes and opposite to the pixel electrodes, and an insulating layer located between the common electrode and the pixel electrodes; and
each of the pixel electrodes includes a hole formed in a shape of a slit.

7. The liquid crystal display device of claim 2, wherein:
the first substrate further comprises a common electrode located below the pixel electrodes and opposite to the pixel electrodes, and an insulating layer located between the common electrode and the pixel electrodes; and
each of the pixel electrodes includes a hole formed in a shape of a slit.

8. The liquid crystal display device of claim 1, wherein:
the first substrate further comprises a common electrode located below the pixel electrodes and opposite to the pixel electrodes, and an insulating layer located between the common electrode and the pixel electrodes; and
each of the pixel electrodes includes a hole formed in a shape of a slit.

9. A method of driving a liquid crystal display device which comprises:
a first substrate comprising a plurality of pixel electrodes arranged in a matrix, a plurality of gate lines extending in a row direction of the arranged pixel electrodes, a plurality of source lines extending in a column direction of the arranged pixel electrodes, and a plurality of switching elements, and each of the switching elements being disposed close to an intersection of an associated one of the gate lines and an associated one of the source lines;
a second substrate located opposite to the first substrate;
a liquid crystal layer held between the first substrate and the second substrate; and
a driver configured to drive the gate lines and the source lines,
the method comprising:
causing the driver to carry out one of a column-inversion driving and an intermittent dot-inversion driving in which an idle period for the driver is provided, said one of the ordinary driving and the intermittent driving being set by switching; and
supplying signals to a plurality of pixel electrodes of each of columns of the pixel electrodes in each of frame periods in the intermittent driving, the supplied signals having polarities inverted in units of at least one row,
wherein, during the idle time dot-inversion patterns that are supplied by the dot-inversion driving are held on the plurality of pixel electrodes.

10. The method of claim 9, wherein in each of frame periods in the ordinary driving, signals having the same polarity are supplied to a plurality of pixel electrodes of said each column of pixel electrodes.

11. The method of claim 9, wherein if the intermittent driving is set by the switching, in a first frame period, only odd-numbered gate lines of the gate lines are driven, and in a second frame period precedent or subsequent to the first frame period, only even-numbered gate lines of the gate lines are driven.

* * * * *